Patented Nov. 3, 1931

1,830,301

UNITED STATES PATENT OFFICE

EDMOND T. TISZA AND BERNARD JOOS, OF YONKERS, NEW YORK, ASSIGNORS TO THE PYRIDIUM CORPORATION, OF NEPERA PARK, NEW YORK, A CORPORATION OF NEW YORK

METHOD OF OBTAINING HALOGEN PRODUCTS OF DIAMINOPYRIDINE

No Drawing.   Application filed May 7, 1929.   Serial No. 361,267.

This invention is an improvement in methods of obtaining halogen substitution products of diamino-pyridine, and more particularly in a method of obtaining bromo-diamino-pyridine, substantially colorless and suitable for medicinal use.

One of the primary objects of the invention is the provision of a method of preparing from alpha-alpha-diamino-pyridine, a substantially colorless product suitable for medicinal use, internally or externally, in that it is relatively nontoxic to the host, while capable of rendering pathogenic micro-organisms innocuous.

It is known that alpha-alpha-diaminopyridine is very toxic, and only slightly bacteriostatic, so that it cannot be used for medicinal purposes. However, it has been demonstrated that the azo compounds of alpha-alpha-diaminopyridine have very distinct bactericidal properties, and are relatively nontoxic. That is, while they act in the manner desired on pathogenic micro-organisms, they are innocuous to the host. Similar results may be obtained by introducing halogen into the diaminopyridine.

Attempts to brominate alpha-alpha-diaminopyridine directly heretofore were not satisfactory. However, a bromo-alpha-alpha-diamino-pyridine may be obtained by brominating diactyl-alpha-alpha-diamino-pyridine. With this object in view, bromine is reacted directly with a solution of diacetyl-alpha-alpha-diamino-pyridine, in a suitable solvent, such as water, or the like, and the primary product is saponified to obtain the bromo-alpha-alpha-diamino-pyridine. An example of the method is given below.

solved in 900 cc. of water by boiling. The solution is cooled to 85°, and 5 cc. ferric chloride solution of 10% are added as a halogen carrier, after which 27 gms. (9 cc.) of bromine are added under constant stirring. When all of the bromine has been added, the color of the liquid is black. Water to the amount of 500 cc. is added to the liquid, which is then boiled, and the small quantity of the black precipitate is filtered off. The solution is then made slightly alkaline with concentrated sodium hydroxide solution and again boiled. The alkali changes the color of the liquid to a light brownish yellow, with a small quantity of a gray brown precipitate. This is filtered off, and the filtrate evaporated. The resulting brown colored substance is washed with cold water, to dissolve the sodium bromide and unchanged diacetyl diaminopyridine, and the residue is recrystallized out of toluol or distilled water with the addition of a small quantity of charcoal, to a constant melting point.

The beta-bromo-alpha-compound crystallizes out of water, in long, thick, cream colored needles, and out of toluol, in short, thick, cream colored needles. Its melting point is 174 to 175° C. The compound is slightly soluble in cold water and in cold toluol.

The compound dissolves more easily in hot water, and is very soluble in hot toluol. It is soluble in alcohol, ether, chloroform, carbon tetrachloride, and very soluble in acetone. The compound is soluble in dilute or concentrated acids. Concentrated sodium hydroxide solution will precipitate the compound from the acid solution, though it is somewhat soluble in dilute alkalies.

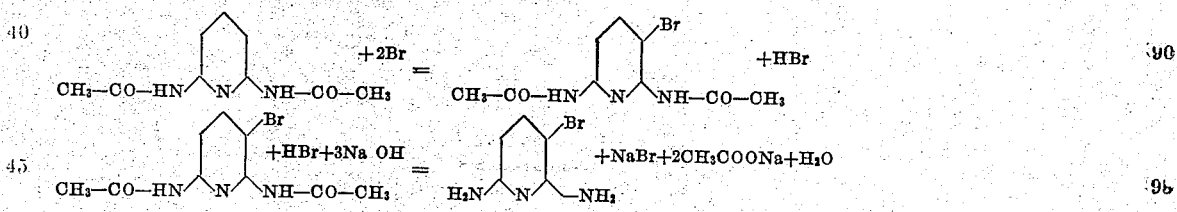

Example

Diacetyl-alpha-alpha-diaminopyridine (M. P. 205°) to the amount of 30 gms. is dis- It is our opinion that the bromination takes place in the beta position, but this statement is purely theoretical and not intended as a limitation, as the halogen may go partly into the gamma position. In the event that the bromination takes place in the beta position, as we believe, the end product would be in accordance with the formula:—

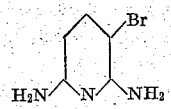

The bromo-alpha-alpha-diaminopyridine obtained as above described, has a distinct bactericidal action against the common pathogenic germs, and its toxicity is less than that of alpha-alpha-diamino-pyridine. The compound is intended for therapeutic use, and to serve as a starting material for the production of other new substances.

Other members of the halogen group, chlorine or iodine, may obviously be used in place of bromine to obtain halogen substituted products of alpha-alpha-diamino-pyridine.

What is claimed as new is:

1. The method of obtaining a beta halogen substituted alpha-alpha-diamino-pyridine, which consists in reacting diacetyl-alpha-alpha-diamino-pyridine in solution with the halogen, and saponifying the product.

2. The method of reducing the toxicity of alpha-alpha-diamino-pyridine, which consists in introducing a halogen into the beta position of the pyridine ring of the alpha-alpha-diamino-pyridine.

3. The method of obtaining a beta bromine substituted alpha-alpha-diamino-pyridine, which consists in treating the diacetyl product of the said compound in aqueous solution with the bromine and consequently saponifying the primary product.

4. As a new article of manufacture, a substantially colorless medicinal substance composed of alpha-alpha-diamino-pyridine with a halogen in the beta position of the pyridine ring.

5. As a new article of manufacture, a beta-bromo compound of alpha-alpha-diamino-pyridine substantially colorless, crystallized from water or toluol.

Signed at Yonkers in the county of Westchester and State of New York this 2nd day of May A. D. 1929.

EDMOND T. TISZA.
BERNARD JOOS.